United States Patent
Souzy et al.

(10) Patent No.: US 8,790,491 B2
(45) Date of Patent: Jul. 29, 2014

(54) USE OF A STYRENE LATEX 100 NM IN SIZE AS A RHEOLOGICAL AGENT IN A PAPER COATING, THE PAPER COATING, AND THE METHOD FOR OBTAINING IT

(75) Inventors: Renaud Souzy, Caluire et Cuire (FR); Francois Dupont, Lyons (FR)

(73) Assignee: Coatex, Genay (FR)

( * ) Notice: Subject to any disclaimer, the term of this patent is extended or adjusted under 35 U.S.C. 154(b) by 512 days.

(21) Appl. No.: 13/080,859

(22) Filed: Apr. 6, 2011

(65) Prior Publication Data

US 2011/0251307 A1    Oct. 13, 2011

Related U.S. Application Data

(60) Provisional application No. 61/323,467, filed on Jan. 13, 2010.

(30) Foreign Application Priority Data

Apr. 7, 2010   (FR) ...................................... 10 52605

(51) Int. Cl.
| | | |
|---|---|---|
| C09D 109/08 | (2006.01) | |
| C09D 5/00 | (2006.01) | |
| C09D 5/02 | (2006.01) | |
| D21H 19/22 | (2006.01) | |
| D21H 25/02 | (2006.01) | |

(52) U.S. Cl.
CPC ................ C09D 109/08 (2013.01); C09D 5/00 (2013.01); C09D 5/02 (2013.01); D21H 19/22 (2013.01); D21H 25/02 (2013.01)

USPC ........... 162/135; 524/502; 524/529; 524/577; 427/445

(58) Field of Classification Search
CPC .......... C09D 109/08; C09D 5/00; C09D 5/02; D21H 19/22; D21H 25/02
USPC ............ 162/135; 427/445; 524/502, 529, 577
See application file for complete search history.

(56) References Cited

U.S. PATENT DOCUMENTS

| | | |
|---|---|---|
| 4,134,872 A | 1/1979 | Lee |
| 5,420,190 A | 5/1995 | Gane |
| 7,256,229 B2 * | 8/2007 | Yeu et al. ...................... 524/157 |
| 2004/0249055 A1 | 12/2004 | Yeu et al. |
| 2007/0212532 A1 | 9/2007 | Krumbacher et al. |
| 2008/0097019 A1 | 4/2008 | Lee et al. |
| 2010/0055446 A1 | 3/2010 | Seyffer et al. |
| 2010/0080919 A1 | 4/2010 | Krumbacher et al. |

FOREIGN PATENT DOCUMENTS

| | | |
|---|---|---|
| GB | 1 590 399 | 6/1981 |
| WO | WO 03/044273 A1 | 5/2003 |
| WO | WO 2008/069538 A1 | 6/2008 |

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

The invention relates to coating slip including latex comprising styrene and with a particle size centered around 100 nm, the use of latex as an agent for reducing the low shear gradient viscosity and increasing the low shear gradient viscosity, and methods thereof.

23 Claims, No Drawings

USE OF A STYRENE LATEX 100 NM IN SIZE AS A RHEOLOGICAL AGENT IN A PAPER COATING, THE PAPER COATING, AND THE METHOD FOR OBTAINING IT

CROSS REFERENCE TO RELATED APPLICATIONS

This application claims the benefit of U.S. provisional application 61/323,467 filed Apr. 13, 2010 and French patent application 10 52605 filed Apr. 7, 2010.

The present invention concerns the field of paper and deals more particularly with certain additives known by the expression "rheology modifiers". These additives are involved in the formulation of coating slips, which are aqueous formulations intended to be applied to the surface of the sheet of paper.

The invention more particularly deals with the implementation of rheology modifiers having the property of increasing the viscosity of these coatings with a low shear rate, and decreasing it at a high rate. This compromise corresponds to obtaining a coating slip that is both workable (increasing the low gradient viscosity), and can be used for coating at high speed or with a high solids content (increasing the high-gradient viscosity, to counterbalance the increase in blade pressure).

The rheology modifiers according to the present invention, besides their simplicity of manufacture, lead to performance levels never achieved before by the rheology modifiers of the prior art: although these modifiers continue to thicken—albeit weakly—the coating with a high shear rate, the inventive rheology modifiers behave like plasticizing agents in this stress range.

As will be seen later on, the property just described is particularly advantageous in high-speed coating processes (1000 to 2000 m/s) or those implementing high solids-content coatings (greater than 70% of their total weight) or those characterized by a low deposit, or a combination of these processes. Additionally, these results may be obtained by correctly substituting the inventive rheology modifier for a part of the coating's main binder, a particularly expensive compound: as a result, the cost of the formulation is greatly improved.

Within the context of manufacturing the sheet of paper through coating, an aqueous composition known as "coating slip" is deposited onto the surface of the paper base, its function being to give said sheet a certain number of properties, such as opacity, brightness, whiteness, or printability when using offset or gravure printing methods.

These coating slips are made up of water, one or more mineral fillers, such as natural or synthetic calcium carbonate, kaolin, talc, or titanium oxide, one or more binders whether water-soluble or not, of natural origin (such as starch, casein, or carboxymethylcellulose—CMC), and/or of synthetic origin (such as styrene-butadiene or styrene-acrylate latex emulsions, and vinylic copolymers), as well as various additives (such as dispersing agents, water-retaining agents, optical brighteners, etc.).

One particular category among these additives makes it possible to optimize the coating's rheological characteristics in relationship with the parameters of the coating method and with the properties sought for said coating: that of rheology modifiers. As the name indicates, the purpose of these products is to regulate the coating slip's rheology, i.e. to adjust its viscosity, as appropriate for the stress that is applied to it.

To that end, it is of utmost importance to have a coating slip that can easily be pumped and filtered into the coating method's supply circuits, and with no tendency to the formation of foam or splatters and to excessively fast sedimentation. This requirement corresponds to increasing the low shear rate viscosity, or the Brookfield™ viscosity measured at 100 revolutions/minute and at 25° C. with the device of the same name, without which the coating slip is too liquid.

Another major rheological characteristic is the high shear rate viscosity, as expressed through a ACAV viscosity value at 25° C. measured in a capillary viscosimeter in which the coating may be subjected to high shear rates ($10^5$ à $3 \times 10^6$ s$^{-1}$) of the same order of magnitude as those observed during the coating method when the coating blade scraping off the excess deposited coating slip is applied. High shear rate viscosity is a determining factor in which blade pressure to apply. The greater the high shear rate viscosity, the greater the blade pressure must be to control the deposited coat weight.

Thus, increasing the solids content of the coating slips and increasing the coating speeds are trends that have been observed for several years, as they have economic and/or quality advantages. This is because increasing the solids content of the coating slip enables a reduction in costs: the quantity of energy needed to dry the coating slip is thereby decreased. This increase also makes it possible to improve the quality of the paper: the penetration of the coating slip into the paper base is reduced, which is favorable to the development of brightness. However, this increase in dry solids content leads to an increase in the shear viscosity, and consequently to an increase in the necessary blade pressures.

Faster coating speeds generate an increase in the hydraulic force on the blade, and thereby in the pressure to be exerted. Increases in blade pressures may then reach unacceptable levels, generally accompanied by overflows of coatings, known by the terms "bleed" or "pearls."

It therefore becomes useful for the person skilled in the art to have a rheology modifier according to the invention that makes it possible to reach the necessary low shear rate viscosity and to decrease the high shear rate viscosity so to as to exploit the benefits raising the speed or raising the solids content of the coating slips without exceeding the limits of its process and while also avoiding the formation of overflow. This issue is recounted in the document WO 84/04491.

Among the rheology modifiers of the prior art, a distinction is made between products of natural origin (of which carboxymethylcellulose—or CMC—is the most widespread) and those of synthetic origin. Among the latter, the best-known are acrylic polymers including ASE (Alkali Swellable Emulsion) and HASE (Hydrophobically modified Alkali Swellable Emulsion) polymers. The first designates chemicals in emulsion that are homopolymers or copolymers of (meth)acrylic acid with an ester of these acids, and the second designates chemicals in emulsion that are copolymers based on (meth)acrylic acid, an ester of these acids and a hydrophobic monomer.

All of these rheology modifiers behave like thickeners, regardless of the stress level or shear rate being considered. CMC, as well as the ASE or HASE polymers that have appeared more recently, increase the Brookfield viscosity, but also and always increase the high shear rate viscosity.

Thus, the document EP 1,611,238 describes this property in general for ASE and HASE polymers, and preferentially for an associative thickener comprising less than 10% by weight of a hydrophobic monomer. We note that such a product has already been disclosed in the document WO 99/33890.

However, all of these documents refer only to limiting the relative increase in viscosity under high stress: none of the presently known additives make it possible to truly decrease the high shear rate viscosity compared to the same coating not containing the additive in question. Thus, none of the rheology modifiers/thickeners of the prior art is fully satisfactory to a person skilled in the art.

The possibility is also described of decreasing the high shear rate viscosity through a careful selection and combination of sizes of particles of the main synthetic latex (in particular, see the documents WO 84/04491 and WO 02/070615) bimodal or trimodal models. The Applicant has been able to confirm the decrease in high shear rate viscosities while reproducing the above conditions by adding to the coating slip so-called secondary latexes with various sizes and compositions. These additions have recreated the advantageous conditions of bi-modal or tri-modal particle size distribution of latex binders, which enable a decrease in high shear rate viscosity.

However, as mentioned above, the person skilled in the art simultaneously wishes to increase the low share rate viscosity, which is well described by the Brookfield™ viscosity measurement. Additionally, the Applicant has observed that the so-called secondary latexes of the prior art lead to a decrease in the low share rate viscosity concomitant with the decrease in the high share rate viscosity.

Yet surprisingly, certain very particular secondary latexes which are mainly styrene-based and have a particle size of between 50 nm and 150 nm, are capable of satisfying the demand of the person skilled in the art for a decrease in high shear rate viscosities accompanied by an increase in the low shear rate viscosity.

The Applicant has been able to identify and demonstrate that the combination of the chemical nature of the latex and its grain size is what leads to such a result (throughout the present Application, the latex particle sizes are determined by well-known Dynamic Light Scattering methods).

Entirely surprisingly and particularly advantageously, these products make it possible not merely to increase the Brookfield™ viscosity, but also to decrease the ACAV viscosity of the coatings. No longer is the relative increase of the high shear rate viscosity merely being minimized; rather, it actually decreases compared to the same coating slip not containing the additive in question: such a result had never been achieved before. It is well understood that the aforementioned increase and decrease in viscosity are relative to the viscosity values obtained for the same coating slip, but not containing the inventive latex.

These latexes therefore prove particularly attractive for performing high-speed coatings or working with coating slips that exhibit a high solids content. Additionally, they are well-known and described in the literature: very simple to manufacture, their production cost is relatively low. Additionally, the Applicant has successfully demonstrated that these latexes, while positively contributing to the rheology of the coating as described above, may be used as a replacement for part of the main binder, a particularly expensive component.

Thus, a first object of the invention consists of the usage of a latex (a) as an agent making it possible to increase the low shear rate viscosity and to decrease the high shear rate viscosity,
it being understood that said coating contains water, (b) at least one binder, (c) potentially another rheology-modifying agent besides the present latex, (d) potentially at least one other additive different from the aforementioned compounds, (e) and at least one mineral material,
said latex (a) being characterized:
1) in that it is made up of at least 80%, more preferably at least 95%, and most preferably 100% by weight of styrene compared to its total weight,
2) and in that it exhibits a particle size between 50 and 150 nm, more preferably between 60 and 120 nm.

This usage is further characterized in that said latex, whenever it is only made up of styrene, contains 0.01 to 20%, more preferably 0.01 to 5% by weight compared to its total weight, of at least one other monomer besides the styrene chosen from among butadiene, acrylonitrile, acrylamide, N-methylolacrylamides, vinyl acetate, acrylic acid, alkyl acrylates, and preferably from among ethyl and butyl (meth)acrylates, hydroxyalkyl (meth)acrylates, and mixtures thereof, and chosen most preferably from among ethyl and butyl (meth)acrylates and mixtures thereof.

This usage is also characterized in that the coating slip contains:
a mass of water of between 20% and 50%, more preferably between 25% and 45% of its total weight,
and, expressed in parts by dry weight per 100 parts by dry weight of mineral material (e):
 (a) 0.1 parts to 5 parts, more preferably 0.5 to 4.0 parts by dry weight of said latex (a), per 100 parts by dry weight of mineral material (e),
 (b) 3 parts to 20 parts, more preferably 5 parts to 17 parts by weight of the binder (b), per 100 parts by dry weight of mineral material (e),
 (c) 0 part to 1 part, more preferably 0 to 0.5 part by dry weight of the other rheology modifier (c), per 100 parts by weight of mineral material (e),
 (d) 0 part to 1 part, more preferably 0 to 0.5 part by dry weight of at least one other additive (d) different from the aforementioned compounds, per 100 parts by dry weight of mineral material (e).

This usage is further characterized in that the binder (b) is chosen from among styrene-butadiene latexes, styrene-acrylics, and vinyl acetates.

This usage is further characterized in that the other rheology-modifying agent (c) is chosen from among thickeners made up of copolymers of (meth)acrylic acid with an ester of these acids, and copolymers based on (meth)acrylic acid, an ester of these acids and a hydrophobic monomer, urea-based thickeners, gelatin-based thickeners, vinyl pyrrolidone-based thickeners, and potentially modified cellulose-based thickeners.

This usage is further characterized in that the additive (d) is chosen from among starch, casein, calcium stearate, optical brighteners and dyes, polyvinyl alcohol, anti-foaming agents, and insolubilizers.

This usage is further characterized in that the mineral material (e) exhibits a particle size distribution such that at least 60% by weight of the particles have a diameter less than 2 µm.

In a first variant, when the mineral material (e) exhibits a particle size distribution such that at least 90% by weight of the particles have a diameter less than 2 µm, this usage is further characterized in that the latex exhibits a particle size between 60 nm and 100 nm.

In a second variant, when the mineral material (e) exhibits a particle size distribution such that at least 95% by weight of the particles have a diameter less than 2 µm, this usage is further characterized in that the latex exhibits a particle size between 80 nm and 120 nm.

This usage is further characterized in that the mineral material (e) is chosen from among natural and/or precipitated calcium carbonates, talc and kaolin, and is more preferably a natural calcium carbonate.

Another object of the invention consists of a method for manufacturing a coating slip, by mixing water and a latex (a), at least one binder (b), potentially at least one other rheology-modifying agent (c) besides the present latex, potentially at least one other additive (d) different from the aforementioned compounds, and at least one mineral material (e), said latex (a) being characterized:
1) in that it is made up of at least 95%, more preferably at least 98%, and most preferably 100% by weight of styrene compared to its total weight,
2) and in that it exhibits a particle size between 50 and 150 nm, more preferably between 60 and 120 nm.

This method is further characterized in that said latex, whenever it is only made up of styrene, contains 0.01 to 20%, more preferably 0.01 to 5% by weight compared to its total weight, of at least one other monomer besides the styrene chosen from among butadiene, acrylonitrile, acrylamide, N-methylolacrylamides, vinyl acetate, acrylic acid, alkyl acrylates, and preferably from among ethyl and butyl (meth) acrylates, hydroxyalkyl (meth)acrylates, and mixtures thereof, and chosen most preferably from among ethyl and butyl (meth)acrylates and mixtures thereof.

This method is further characterized in that it implements the mixture:
of a mass of water between 20% and 50%, more preferably between 25% and 45% of the total weight of the coating slip,
and, expressed in parts by dry weight per 100 parts by dry weight of mineral material (e):
(a) 0.1 parts to 4 parts, more preferably 0.5 to 3.0 parts by dry weight of said latex (a), for 100 parts by dry weight of mineral material (e),
(b) 3 parts to 20 parts, more preferably 5 parts to 15 parts by weight of the binder (b), per 100 parts by dry weight of mineral material (e),
(c) 0 part to 1 part, more preferably 0 to 0.5 part by dry weight of the other rheology modifier (c), per 100 parts by weight of mineral material (e),
(d) 0 part to 1 part, more preferably 0 to 0.5 part by dry weight of at least one other additive (d) different from the aforementioned compounds, per 100 parts by dry weight of mineral material (e).

This method is further characterized in that the binder (b) is chosen from among styrene-butadiene latexes, styrene-acrylics, and vinyl acetates.

This method is further characterized in that the other rheology-modifying agent (c) is chosen from among thickeners made up of copolymers of (meth)acrylic acid with an ester of these acids, and copolymers based on (meth)acrylic acid, an ester of these acids and a hydrophobic monomer, urea-based thickeners, gelatin-based thickeners, vinyl pyrrolidone-based thickeners, and potentially modified cellulose-based thickeners.

This method is further characterized in that the other additive (d) is chosen from among starch, casein, calcium stearate, optical brighteners and dyes, polyvinyl alcohol, anti-foaming agents, and insolubilizers.

This method is further characterized in that the mineral material (e) exhibits a particle size distribution such that at least 60% by weight of the particles have a diameter less than 2 µm.

In a first variant, when the mineral material (e) exhibits a particle size distribution such that at least 90% by weight of the particles have a diameter less than 2 µm, this method is further characterized in that the latex exhibits a particle size between 60 nm and 100 nm.

In a second variant, when the mineral material (e) exhibits a particle size distribution such that at least 95% by weight of the particles have a diameter less than 2 µm, this method is further characterized in that the latex exhibits a particle size between 80 nm and 120 nm.

This method is further characterized in that the mineral material (e) is chosen from among natural and/or precipitated calcium carbonates, talc and kaolin, and is more preferably a natural calcium carbonate.

A third object of the invention consists of a coating slip containing water, a latex (a), at least one binder (b), potentially at least one other rheology-modifying agent (c) besides the present latex, potentially at least one other additive (d) different from the aforementioned compounds, and at least one mineral material (e), said latex (a) being characterized:
1) in that it is made up of at least 95%, more preferably at least 98%, and most preferably 100% by weight of styrene compared to its total weight,
2) and in that it exhibits a particle size between 50 and 150 nm, more preferably between 60 and 120 nm.

This coating slip is further characterized in that said latex, whenever it is only made up of styrene, contains 0.01 to 20%, more preferably 0.01 to 5% by weight compared to its total weight, of at least one other monomer besides the styrene chosen from among butadiene, acrylonitrile, acrylamide, N-methylolacrylamides, vinyl acetate, acrylic acid, alkyl acrylates, and preferably from among ethyl and butyl (meth) acrylates, hydroxyalkyl (meth)acrylates, and mixtures thereof, and chosen most preferably from among ethyl and butyl (meth)acrylates and mixtures thereof.

This coating slip is further characterized in that it contains:
a mass of water of between 20% and 50%, more preferably between 25% and 45% of its total weight,
and, expressed in parts by dry weight per 100 parts by dry weight of mineral material (e):
(a) 0.1 parts to 4 parts, more preferably 0.5 to 3.0 parts by dry weight of said latex (a), for 100 parts by dry weight of mineral material (e),
(b) 3 parts to 20 parts, more preferably 5 parts to 15 parts by weight of the binder (b), per 100 parts by dry weight of mineral material (e),
(c) 0 part to 1 part, more preferably 0 to 0.5 part by dry weight of the other rheology modifier (c), per 100 parts by weight of mineral material (e),
(d) 0 part to 1 part, more preferably 0 to 0.5 part by dry weight of at least one other additive (d) different from the aforementioned compounds, per 100 parts by dry weight of mineral material (e).

This coating slip is further characterized in that the binder (b) is chosen from among styrene-butadiene latexes, styrene-acrylics, and vinyl acetates.

This coating slip is further characterized in that the other rheology-modifying agent (c) is chosen from among thickeners made up of copolymers of (meth)acrylic acid with an ester of these acids, and copolymers based on (meth)acrylic acid, an ester of these acids and a hydrophobic monomer, urea-based thickeners, gelatin-based thickeners, vinyl pyrrolidone-based thickeners, and potentially modified cellulose-based thickeners.

This coating slip is further characterized in that the additive (d) is chosen from among starch, casein, calcium stearate, optical brighteners and dyes, polyvinyl alcohol, anti-foaming agents, and insolubilizers.

This coating slip is further characterized in that the mineral material (e) exhibits a particle size distribution such that at least 60% by weight of the particles has a diameter less than 2 µm.

In a first variant, when the mineral material (e) exhibits a particle size distribution such that at least 90% by weight of the particles have a diameter less than 2 µm, this coating slip is further characterized in that the latex exhibits a particle size between 60 nm and 100 nm.

In a second variant, when the mineral material (e) exhibits a particle size distribution such that at least 95% by weight of the particles have a diameter less than 2 μm, this coating slip is further characterized in that the latex exhibits a particle size between 80 nm and 120 nm.

This coating slip is further characterized in that the mineral material (e) is chosen from among natural and/or precipitated calcium carbonates, talc and kaolin, and is more preferably a natural calcium carbonate.

A fourth and final object of the invention consists of a method for coating a paper base, by depositing onto said paper a coating slip having the characteristics as described above.

The following examples will make it possible to better understand the invention, though without limiting its scope.

EXAMPLES

Example 1

In this example, a coating slip is formulated, whose composition is given below. Such a coating slip may typically be implemented as a top-layer. Said coating slip is made up of:
- 100 parts by dry weight of calcium carbonate sold by the company OMYA™ under the name Hydrocarb™ 95 ME (95% by weight of the particles have a mean diameter less than 2 μm),
- a styrene-butadiene binder sold by the company DOW™ CHEMICALS under the name DL 966, whose particle size is 160 nm,
- a polyvinyl alcohol sold by the company CLARIANT™ under the name Mowiol™ 4-98,
- an optical brightener sold by the company KEMIRA under the name Blankophor™ P01.

The corresponding quantities (by dry weight compared to the dry weight of calcium carbonate) are indicated in table 1.

The solid content of each coating slip is fixed at 71.5% of its total weight.

In this example, the influence of various additives on Brookfield™ viscosity at 100 revolutions/minute and at 25° C. (Bk in mPa·s in table 1), and on its ACAV viscosity at a shear rate equal to $10^6$ s$^{-1}$ and at 25° C. (ACAV in mPa·s in table 1). These additives are either commercial rheology modifiers, or latexes whose composition is made to vary (pure styrene or methacrylic acid/ethyl acrylate/styrene) as well as the particle size.

Test No. 1
This test corresponds to a coating slip with no rheological additives.

Test No. 2
This test illustrates a domain outside the invention's scope, and implements 0.2 part by weight (compared to the dry weight of calcium carbonate) of CMC sold by the company HUBER™ under the name Finfix™ 10.

Test No. 3
This test illustrates a domain outside the invention's scope, and implements 0.13 part by weight (compared to the dry weight of calcium carbonate) of an ASE acrylic emulsion (compared to the dry weight of calcium carbonate) sold by the company COATEX™ under the name Rheocoat™ 66.

Test No. 4
This test illustrates a domain outside the invention's scope, and implements 0.11 part by weight (compared to the dry weight of calcium carbonate) of a HASE acrylic emulsion sold by the company COATEX™ under the name Rheocoat™ 73.

Test No. 5
This test illustrates a domain outside the invention's scope, and implements 2 parts by dry weight (compared to the dry weight of calcium carbonate) of a latex made up of ethyl acrylate, methacrylic acid, and styrene (59/16/25 by weight in %) and with a particle size equal to 68 nm.

Test No. 6
This test illustrates a domain outside the invention's scope, and implements 2 parts by dry weight (compared to the dry weight of calcium carbonate) of a latex made up of ethyl acrylate, methacrylic acid, and styrene (59/16/25 by weight in %) and with a particle size equal to 160 nm.

Test No. 7
This test illustrates a domain outside the invention's scope, and implements 2 parts by dry weight (compared to the dry weight of calcium carbonate) of a latex made up of ethyl acrylate, methacrylic acid, and styrene (59/16/25 by weight in %) and with a particle size equal to 144 nm.

Test No. 8
This test illustrates a domain outside the invention's scope, and implements 2 parts by dry weight (compared to the dry weight of calcium carbonate) of a latex made up of ethyl acrylate, methacrylic acid, and styrene, and methyl methacrylate (41/5/40/13 by weight in %) and with a particle size equal to 344 nm.

Test No. 9
This test illustrates the invention, and implements 2 parts by dry weight (compared to the dry weight of calcium carbonate) of a latex made up only of styrene and with a particle size equal to 96 nm.

Test No. 10
This test illustrates a domain outside the invention's scope, and implements 2 parts by dry weight (compared to the dry weight of calcium carbonate) of a latex made up of ethyl acrylate, methacrylic acid, and styrene (41/6/53 by weight in %) and with a particle size equal to 347 nm.

Test No. 11
This test illustrates a domain outside the invention's scope, and implements 2 parts by dry weight (compared to the dry weight of calcium carbonate) of a latex made up of ethyl acrylate, methacrylic acid, and styrene (41/6/53 by weight in %) and with a particle size equal to 281 nm.

Test No. 12
This test illustrates a domain outside the invention's scope, and implements 2 parts by dry weight (compared to the dry weight of calcium carbonate) of a latex made up of ethyl acrylate, methacrylic acid, and styrene (41/6/53 by weight in %) and with a particle size equal to 172 nm.

Test No. 13
This test illustrates a domain outside the invention's scope, and implements 2 parts by dry weight (compared to the dry weight of calcium carbonate) of a latex made up of ethyl acrylate, methacrylic acid, and styrene (41/6/53 by weight in %) and with a particle size equal to 112 nm.

Test No. 14
This test illustrates a domain outside the invention's scope, and implements 2 parts by dry weight (compared to the dry weight of calcium carbonate) of a latex made up of ethyl acrylate, methacrylic acid, and styrene (41/6/53 by weight in %) and with a particle size equal to 67 nm.

Test No. 15
This test illustrates a domain outside the invention's scope, and implements 2 parts by dry weight (compared to the dry weight of calcium carbonate) of a styrene-butadiene latex (50/50 by weight in %) and with a particle size equal to 89 nm.

Test No. 16
This test illustrates a domain outside the invention's scope, and implements 2 parts by dry weight (compared to the dry weight of calcium carbonate) of a latex made up only of styrene and with a particle size equal to 200 nm.

Test No. 17

This test illustrates the invention, and implements 2 parts by dry weight (compared to the dry weight of calcium carbonate) of the latex from test 9 made up only of styrene and with a particle size equal to 96 nm. Additionally, the quantity of the main acrylic binder DL 966 has been reduced to 6 parts here.

The dataset appears in table 1. Note that the rheology modifiers of the prior art (CMC, Rheocoat™ 66 and 73 in tests nos. 2, 3 and 4) used in normal dosages, behave like thickeners regardless of the shear rate. An additional test has been carried out implementing 2 parts by dry weight of Rheocoat™ 66 (compared to the dry weight of calcium carbonate), but the coating slip obtained was so viscous that it was impossible to measure its Brookfield™ viscosity at 100 revolutions per minute.

For latexes made up of styrene and at least one other monomer (in a quantity much greater than 20% by weight), it is observed that none of them make it possible to increase the value of the Brookfield™ viscosity at 100 revolutions/minute, regardless of their particle size which varies between 67 nm and 347 nm (tests nos. 2 to 6 and 8 to 15).

Finally, for the 3 latexes made up only of styrene (tests nos. 7, 16, and 17), the latex whose particle size is greater than 150 nm (200 nm in test no. 16), does not makes it possible to increase both the Brookfield viscosity and 100 revolutions/minute while also reducing the ACAV viscosity at a shear rate of $10^6$ $s^{-1}$. On the other hand, in test no. 7 which implements 8 parts of main binder, a very high increase in the low shear rate viscosity is observed, as is a very large drop in the high shear rate viscosity.

The dual beneficial influence of the composition of the considered latex and its particle size is thereby demonstrated: Only the particular choice of a latex made up of styrene, and a particle size close to 100 nm, would make it possible to increase the low shear rate viscosity and to decrease it at a high shear rate. The resulting coating slips, which have a high solids content (71.5% of their total weight) will therefore be perfectly well-suited to be laid on at high speeds.

Finally, the test 17 that only implements 6 parts of the main binder demonstrates that the rheological compromise described above, while reducing the portion of main binder.

Example 2

In this example, a coating slip is formulated, whose composition is given below. Such a coating slip may typically be implemented as a top-layer. Said coating slip is made up of:
100 parts by dry weight of calcium carbonate sold by the company OMYA™ under the name Setacarb™ 95 ME (95% by weight of the particles have a mean diameter less than 2 μm),
a styrene-butadiene binder sold by the company DOW™ CHEMICALS under the name DL 966, whose particle size is 160 nm,
a polyvinyl alcohol sold by the company CLARIANT™ under the name Mowiol™ 4-98,
an optical brightener sold by the company KEMIRA under the name Blankophor™ P01.

The corresponding quantities (by dry weight compared to the dry weight of calcium carbonate) are indicated in table 2.

The solid content of each coating slip is fixed at 70.5% of its total weight.

In this example, the influence of various additives on Brookfield™ viscosity at 100 revolutions/minute and at 25° C. (Bk in mPa·s in table 1), and on its ACAV viscosity at a shear rate equal to $10^6$ $s^{-1}$ and at 25° C. (ACAV in mPa·s in table 1).

These latexes illustrate the invention and are made up of styrene and another monomer, at a rate of less than 20% by weight.

Test No. 18

This test corresponds to a coating slip with no rheological additives.

Test No. 19

This test illustrates the invention, and implements 2 parts by dry weight (compared to the dry weight of calcium carbonate) of a latex made up of styrene and acrylic acid (85/15 by weight in %) with a particle size equal to 111 nm.

Test No. 20

This test illustrates the invention, and implements 2 parts by dry weight (compared to the dry weight of calcium car-

TABLE 1

| | Test no. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Hydrocarb 95 | 100 | 100 | 100 | 100 | 100 | 100 | 100 | 100 | 100 | 100 | 100 | 100 | 100 | 100 | 100 | 100 | 100 |
| DL 966 | 8 | 8 | 8 | 8 | 8 | 8 | 8 | 8 | 8 | 8 | 8 | 8 | 8 | 8 | 8 | 8 | 6 |
| PVA* | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Blankophor | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| test 2 additive | | 0.13 | | | | | | | | | | | | | | | |
| test 3 additive | | | 0.11 | | | | | | | | | | | | | | |
| test 4 additive | | | | 0.2 | | | | | | | | | | | | | |
| test 5 additive | | | | | 2 | | | | | | | | | | | | |
| test 6 additive | | | | | | 2 | | | | | | | | | | | |
| test 7 additive | | | | | | | 2 | | | | | | | | | | |
| test 8 additive | | | | | | | | 2 | | | | | | | | | |
| test 9 additive | | | | | | | | | 2 | | | | | | | | |
| test 10 additive | | | | | | | | | | 2 | | | | | | | |
| test 11 additive | | | | | | | | | | | 2 | | | | | | |
| test 12 additive | | | | | | | | | | | | 2 | | | | | |
| test 13 additive | | | | | | | | | | | | | 2 | | | | |
| test 14 additive | | | | | | | | | | | | | | 2 | | | |
| test 15 additive | | | | | | | | | | | | | | | 2 | | |
| test 16 additive | | | | | | | | | | | | | | | | 2 | |
| test 17 additive | | | | | | | | | | | | | | | | | 2 |
| Bk | 780 | 1540 | 1680 | 1640 | 570 | 580 | 500 | 470 | 1980 | 420 | 460 | 600 | 530 | 460 | 590 | 1120 | 1750 |
| ACAV | 209 | 260 | 273 | 260 | 160 | 150 | 210 | 228 | 172 | 171 | 214 | 193 | 166 | 148 | 182 | 240 | 185 |

*parts in this case bonate) of a latex made up of styrene and ethyl acrylate (85/15 by weight in %) with a particle size equal to 111 nm.

The dataset appears in table 2.

TABLE 2

| Test no. | 18 | 19 | 20 |
|---|---|---|---|
| Setacarb ™ ME | 100 | 100 | 100 |
| DL 966 | 8 | 8 | 8 |
| PVA | 0.4 | 0.4 | 0.4 |
| Blankophor* | 0.5 | 0.5 | 0.5 |
| test 20 additive | | 2 | |
| test 21 additive | | | 2 |
| Bk | 360 | 400 | 565 |
| ACAV | 162 | 123 | 115 |

*parts in this case

It is thereby demonstrated that the low shear rate viscosity may be increased, and the high shear rate viscosity decreased, with latexes whose particle size is between 50 and 150 nm, said latexes containing styrene and less than 20% en by weight of a comonomer which here is acrylic acid or ethyl acrylate.

Example 3

In this example, 2 coating slips are formulated, whose composition is given below, and which differ by the nature of the calcium carbonate implemented. Such a coating slip may typically be implemented as a top-layer. Said coating slip is made up of:

100 parts by dry weight of calcium carbonate sold by the company OMYA™ under the name Setacarb™ 95 ME (95% by weight of the particles have a diameter less than 2 μm), or Hydrocarb™ 90 (90% by weight of the particles have a diameter less than 2 μm), a styrene-butadiene binder sold by the company DOW™ CHEMICALS under the name DL 966, whose particle size is 160 nm, a polyvinyl alcohol sold by the company CLARIANT™ under the name Mowiol™ 4-98, an optical brightener sold by the company KEMIRA under the name Blankophor™ P01.

The corresponding quantities (by dry weight compared to the dry weight of calcium carbonate) are indicated in table 3. The solid content of each coating slip is fixed at 70.5% of its total weight.

In this example, the influence of various latexes on Brookfield™ viscosity at 100 revolutions/minute and at 25° C. (Bk in mPa·s in table 1), and on its ACAV viscosity at a shear rate equal to $10^6$ s$^{-1}$ and at 25° C. (ACAV in mPa·s in table 1).

These latexes illustrate the invention, and are made up only of styrene, whose particle size is made to vary between 80 and 140 nm.

Test No. 21

This test corresponds to a baseline coating slip containing Setacarb™ ME as a mineral load, without any rheological additives.

Test No. 22

This test illustrates the invention, and implements 2 parts by dry weight (compared to the dry weight of calcium carbonate) of a latex made up only of styrene and with a particle size equal to 80 nm.

Test No. 23

This test illustrates the invention, and implements 2 parts by dry weight (compared to the dry weight of calcium carbonate) of a latex made up only of styrene and with a particle size equal to 102 nm.

Test No. 24

This test illustrates the invention, and implements 2 parts by dry weight (compared to the dry weight of calcium carbonate) of a latex made up only of styrene and with a particle size equal to 140 nm.

Test No. 25

This test corresponds to a baseline coating slip containing Hydrocarb™ ME as a mineral load, without any rheological additives.

Test No. 26

This test illustrates the invention, and implements 2 parts by dry weight (compared to the dry weight of calcium carbonate) of the latex used in test no. 22.

Test No. 27

This test illustrates the invention, and implements 2 parts by dry weight (compared to the dry weight of calcium carbonate) of the latex used in test no. 23.

Test No. 28

This test illustrates the invention, and implements 2 parts by dry weight (compared to the dry weight of calcium carbonate) of the latex used in test no. 24.

The dataset appears in table 3.

The 3 tested latexes satisfy the resolution of the technical problem.

That said, the best results are obtained for the latex with particle size equal to 102 nm, as with Setacarb™ ME, and for the latex whose particle size is equal to 80 nm, as with Hydrocarb™ 90. These results therefore illustrate the two particular variants of the invention.

TABLE 3

| | Test no. | | | | | | | |
|---|---|---|---|---|---|---|---|---|
| | 21 | 22 | 23 | 24 | 25 | 26 | 27 | 28 |
| Setacarb ™ ME | 100 | 100 | 100 | 100 | | | | |
| Hydrocarb ™ 90 | | | | | 100 | 100 | 100 | 100 |
| DL 966 | 8 | 8 | 8 | 8 | 8 | 8 | 8 | 8 |
| PVA | 0.4 | 0.4 | 0.4 | 0.4 | 0.4 | 0.4 | 0.4 | 0.4 |
| Blankophor* | 0.5 | 0.5 | 0.5 | 0.5 | 0.5 | 0.5 | 0.5 | 0.5 |
| test additives 22 and 26 | | 2 | | | | 2 | | |
| test additives 23 and 27 | | | 2 | | | | 2 | |
| test additives 24 and 28 | | | | 2 | | | | 2 |
| Bk | 360 | 860 | 1350 | 410 | 480 | 1380 | 925 | 510 |
| ACAV | 162 | 146 | 131 | 146 | 106 | 91 | 91 | 109 |

*parts in this case

The invention claimed is:

1. A method for manufacturing a coating slip, comprising mixing together:
   water,
   a latex,
   a binder,
   a mineral material,
   optionally a rheology-modifying agent that is not said latex, and
   optionally another additive,
   wherein said latex comprises at least 95% by weight of styrene compared to its total weight and said latex has a particle size from 50 to 150 nm, and
   wherein the coating slip produced by said method comprises:
   said water in an amount from 20% to 50% based on the total weight of the coating slip, and, expressed in parts by dry weight per 100 parts by dry weight of the mineral material;
(a) 0.1 parts to 5 parts of said latex,
(b) 3 parts to 20 parts by weight of said binder,
(c) 0 part to 1 part by dry weight of said rheology-modifying agent that is not said latex, and
(d) 0 part to 1 part by dry weight of said another additive.

2. The method according to claim 1, wherein said latex comprises 100% by weight of styrene compared to its total weight.

3. The method according to claim 1, wherein the said latex comprises 0.01 to 5% by weight compared to its total weight of at least one monomer other than styrene selected from the group consisting of butadiene, acrylonitrile, acrylamide, N-methylolacrylamides, vinyl acetate, acrylic acid, alkyl acrylate, and mixtures thereof.

4. The method according to claim 3, wherein the at least one monomer is selected from the group consisting of ethyl (meth)acrylate, butyl (meth)acrylate, hydroxyalkyl (meth)acrylate, and mixtures thereof.

5. The method according to claim 1, wherein the binder is selected from the group consisting of a styrene-butadiene latex, a styrene-acrylic, a vinyl acetate, and mixtures thereof.

6. The method according to claim 1, wherein the coating slip produced by said method comprises said rheology-modifying agent that is not said latex, and wherein said rheology-modifying agent that is not said latex is selected from a copolymer of (meth)acrylic acid with an ester thereof, a copolymer based on (meth)acrylic acid, an ester of (meth)acrylic acid and a hydrophobic monomer, a urea-based thickener, a gelatin-based thickener, a vinyl pyrrolidone-based thickener, a modified cellulose-based thickener, and mixtures thereof.

7. The method according to claim 1, wherein the coating slip produced by said method comprises said another additive, and wherein said another additive is selected from the group consisting of starch, casein, calcium stearate, an optical brightener, an optical dye, polyvinyl alcohol, an anti-foaming agent, an insolubilizer, and mixtures thereof.

8. The method according to claim 1, wherein the mineral material has a particle size distribution such that at least 60% by weight of the particles has a diameter less than 2 µm.

9. The method according to claim 8, wherein when the mineral material has a particle size distribution such that at least 95% by weight of the particles have a diameter less than 2 µm, the latex has a particle size of 80 nm to 120 nm.

10. The method according to claim 1, wherein the mineral material is selected from the group consisting of natural calcium carbonate, precipitated calcium carbonate, talc, kaolin, and mixtures thereof.

11. The method according to claim 1, wherein said latex comprises 98% by weight of styrene compared to its total weight.

12. A coating slip, comprising:
water,
a latex,
a binder,
a mineral material,
optionally a rheology-modifying agent that is not said latex, and optionally another additive,
wherein said latex comprises at least 95% by weight of styrene compared to its total weight and said latex has a particle size from 50 to 150 nm, and
wherein the coating slip comprises:
said water in an amount from 20% to 50% based on the total weight of the coating slip, and, expressed in parts by dry weight per 100 parts by dry weight of the mineral material;
(a) 1 parts to 5 parts of said latex,
(b) 3 parts to 20 parts by weight of said binder,
(c) 0 part to 1 part by dry weight of said rheology-modifying agent that is not said latex, and
(d) 0 part to 1 part by dry weight of said another additive.

13. The coating slip according to claim 12, wherein said latex comprises 100% by weight of styrene compared to its total weight.

14. The coating slip according to claim 12, wherein the said latex comprises 0.01 to 5% by weight compared to its total weight of at least one monomer other than styrene selected from the group consisting of butadiene, acrylonitrile, acrylamide, N-methylolacrylamides, vinyl acetate, acrylic acid, alkyl acrylate, and mixtures thereof.

15. The coating slip according to claim 14, wherein the at least one monomer is selected from the group consisting of ethyl (meth)acrylate, butyl (meth)acrylate, hydroxyalkyl (meth)acrylate, and mixtures thereof.

16. The coating slip according to claim 12, wherein the binder is selected from the group consisting of a styrene-butadiene latex, a styrene-acrylic, a vinyl acetate, and mixtures thereof.

17. The coating slip according to claim 12, wherein the coating slip comprises said rheology-modifying agent that is not said latex, and wherein said rheology-modifying agent that is not said latex is selected from a copolymer of (meth)acrylic acid with an ester thereof, a copolymer based on (meth)acrylic acid, an ester of (meth)acrylic acid and a hydrophobic monomer, a urea-based thickener, a gelatin-based thickener, a vinyl pyrrolidone-based thickener, a modified cellulose-based thickener, and mixtures thereof.

18. The coating slip according to claim 12, wherein the coating slip comprises said another additive, and wherein said another additive is selected from the group consisting of starch, casein, calcium stearate, an optical brightener, an optical dye, polyvinyl alcohol, an anti-foaming agent, an insolubilizer, and a mixture thereof.

19. The coating slip according to claim 12, wherein the mineral material has a particle size distribution such that at least 60% by weight of the particles has a diameter less than 2 µm.

20. The coating slip according to claim 19, wherein when the mineral material has a particle size distribution such that at least 95% by weight of the particles have a diameter less than 2 µm, the latex has a particle size of 80 nm to 120 nm.

21. The coating slip according to claim 12, wherein the mineral material is selected from the group consisting of natural calcium carbonate, precipitated calcium carbonate, talc, kaolin, and a mixture thereof.

22. The coating slip according to claim 12, wherein said latex comprises 98% by weight of styrene compared to its total weight.

23. A method for coating a paper base, comprising depositing onto said paper base a coating slip according to claim 12.

* * * * *